(12) United States Patent
Hong

(10) Patent No.: US 12,230,145 B2
(45) Date of Patent: Feb. 18, 2025

(54) METHODS AND APPARATUSES FOR TRANSMITTING INFORMATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 989 days.

(21) Appl. No.: 17/053,327

(22) PCT Filed: May 10, 2018

(86) PCT No.: PCT/CN2018/086283
§ 371 (c)(1),
(2) Date: Nov. 5, 2020

(87) PCT Pub. No.: WO2019/213887
PCT Pub. Date: Nov. 14, 2019

(65) Prior Publication Data
US 2021/0125506 A1    Apr. 29, 2021

(51) Int. Cl.
*G08G 5/00* (2006.01)
*H04W 4/40* (2018.01)
(Continued)

(52) U.S. Cl.
CPC .......... *G08G 5/003* (2013.01); *G08G 5/0013* (2013.01); *G08G 5/0069* (2013.01); *H04W 4/40* (2018.02);
(Continued)

(58) Field of Classification Search
CPC .... G08G 5/003; G08G 5/0013; G08G 5/0069; H04W 4/40; H04W 36/0058;
(Continued)

(56) References Cited

U.S. PATENT DOCUMENTS

2014/0357279 A1* 12/2014 Lee ................... H04W 36/0009
455/440
2015/0223090 A1* 8/2015 Van Lieshout ......... H04L 51/58
370/252
(Continued)

FOREIGN PATENT DOCUMENTS

CN         103974327 A    8/2014
CN         105338573 A    2/2016
(Continued)

OTHER PUBLICATIONS

Moreira, E. dos S., Profile, V., Vanni, R. M. P., Função, D. L., Marcondes, C. A. C., & Metrics, O. M. A. A context-aware communication link for unmanned aerial vehicles: Proceedings of the 2010 Sixth Advanced International Conference on Telecommunications. Guide Proceedings. https://dl.acm.org/ (Year: 2010).*

(Continued)

*Primary Examiner* — Rami Khatib
*Assistant Examiner* — Shahira Baajour
(74) *Attorney, Agent, or Firm* — Arch & Lake LLP

(57) ABSTRACT

The present disclosure relates methods and apparatuses for transmitting information. The method is applicable to an unmanned aerial vehicle (UAV). The method includes: generating designated event information when the UAV has flight path information, where the designated event information indicates that the UAV has the flight path information; adding the designated event information to a first message; and sending the first message to a base station, such that the base station determines that the UAV has the flight path information according to the designated event information included in the first message.

16 Claims, 6 Drawing Sheets

In response to that a UAV has flight path information, generate designated event information, where the designated event information indicates that the UAV has the flight path information — 110

Add the designated event information to a first message — 120

Send the first message to a base station, such that the base station determines that the UAV has the flight path information according to the designated event information included in the first message — 130

(51) Int. Cl.
  *H04W 36/00* (2009.01)
  *H04W 36/32* (2009.01)
  *H04W 76/19* (2018.01)
  *H04W 76/27* (2018.01)

(52) U.S. Cl.
  CPC ..... *H04W 36/0058* (2018.08); *H04W 36/328* (2023.05); *H04W 76/19* (2018.02); *H04W 76/27* (2018.02)

(58) Field of Classification Search
  CPC ..... H04W 76/19; H04W 76/27; H04W 36/32; H04W 4/029; H04W 4/06; H04W 4/42; B64C 39/00; G05D 1/10
  See application file for complete search history.

(56) References Cited

U.S. PATENT DOCUMENTS

| | | | |
|---|---|---|---|
| 2016/0300492 | A1 | 10/2016 | Pasko et al. |
| 2016/0301790 | A1* | 10/2016 | Kanamarlapudi .... H04W 8/183 |
| 2016/0363929 | A1 | 12/2016 | Clark |
| 2017/0142766 | A1 | 5/2017 | Kim |
| 2019/0156681 | A1* | 5/2019 | Whiting ............... G08G 5/0013 |
| 2019/0227568 | A1* | 7/2019 | Altinger ............. G01C 21/3415 |
| 2019/0253531 | A1* | 8/2019 | Basu Mallick ....... H04W 28/20 |
| 2020/0258397 | A1 | 8/2020 | Hong |
| 2020/0344661 | A1 | 10/2020 | Hong |

FOREIGN PATENT DOCUMENTS

| | | | | |
|---|---|---|---|---|
| CN | 205510112 U | 8/2016 | | |
| CN | 107289945 A | 10/2017 | | |
| CN | 107357309 A | 11/2017 | | |
| CN | 107371152 A | 11/2017 | | |
| CN | 108064360 A | 5/2018 | | |
| CN | 108064465 A | 5/2018 | | |
| EP | 2175290 A1 | 4/2010 | | |
| RU | 2390815 C1 | 5/2010 | | |
| RU | 2562890 C2 | 9/2015 | | |
| WO | WO-2012023161 A1 * | 2/2012 | ............ | H04W 24/10 |
| WO | 2016033754 A1 | 3/2016 | | |
| WO | 2018036609 A1 | 3/2018 | | |

OTHER PUBLICATIONS

State Intellectual Property Office of the People's Republic of China, Office Action and Search Report Issued in Application No. 201880000645.1, Apr. 13, 2021, 19 pages. (Submitted with Machine/Partial Translation).

European Patent Office, Extended European Search Report Issued in Application No. 189179039, Apr. 23, 2021, Germany, 12 pages.

Huawei, HiSilicon, CMCC, Fraunhofer, Nokia, Nokia Shanghai Bell, Lenovo, Motorola Mobility, InterDigital, KDDI, "Discussion on flight path information", 3GPP TSG-RAN WG2 Meeting #101bis, Sanya, China,, R2-1805125, Apr. 16-20, 2018, 4 pages.

Nokia, Nokia Shanghai Bell,"Potential mobility enhancements for UAVs",3GPP TSG-RAN WG2 #99bis,Prague, Czech Republic, R2-1711445, Resubmission of R2-1708667, Oct. 9-13, 2017, 2 pages.

ISA State Intellectual Property Office of the People's Republic of China, Written Opinion of the International Searching Authority Issued in Application No. PCT/CN2018/086283, Jan. 9, 2019, WIPO, 9 pages.

International Search Report issued in PCT Application No. PCT/CN2018/086283 dated Jan. 9, 2019 and English translation, (6p).

First Office Action issued in Chinese Application No. 201880000645.1 dated Jan. 13, 2020 with English translation (22p).

State Intellectual Property Office of the People's Republic of China, Second Office Action and Search Report Issued in Application No. 201880000645.1, Oct. 10, 2020, 10 pages. (Submitted with Machine/Partial Translation).

Korean Intellectual Property Office, Office Action Issued in Application No. 10-2020-7034995, Apr. 1, 2022, 7 pages. (Submitted with Partial Machine Translation).

Japanese Patent Office, Second Office Action Issued in Application No. 2020-562168, Jun. 2, 2022, 5 pages. (Submitted with Machine Translation).

Intellectual Property Office of Singapore, Search Report and Written Opinion Issued in Application No. 11202011126V, dated Aug. 10, 2022,(10p).

Intellectual property India, Office Action Issued in Application No. 202047053014 dated Dec. 15, 2021, (6p).

Japanese Patent Office Action, Office Action Issued in Application No. 2020-562168 dated Nov. 9, 2021 with English translation (6p).

Korean Intellectual Property Office, Office Action Issued in Application No. 10-2020-7034995 dated Jan. 3, 2022 with English translation (8p).

Huawei, HiSilicon, "Identification of Air-borne UE", 3GPP TSG-RAN WG2 Meeting #99, R2-1708543, Berlin, Germany, Aug. 21-25, 2017, (3p).

Fraunhofer HHI, Fraunhofer IIS, "Flight Path Information Report: Trigger and Content", 3GPP TSG-WG2 Meeting #102, R2-1807212, Busan, Korea, May 21-25, 2018, (5p).

\* cited by examiner

METHODS AND APPARATUSES FOR TRANSMITTING INFORMATION

CROSS REFERENCE TO RELATED APPLICATIONS

The present application is the U.S. national phase of PCT Application No. PCT/CN2018/086283 filed on May 10, 2018, which is incorporated herein by reference in its entirety.

TECHNICAL FIELD

The present disclosure relates to the field of communications, and in particular, to methods and apparatuses for transmitting information.

BACKGROUND

An unmanned aerial vehicle is called a UAV for short, which is an unmanned aircraft operated by a radio remote control device and a build-in program control device.

With the continuous development of UAV technologies, UAVs have also been widely used. Sometimes, to further expand an application range of the UAVs, a cellular network is expected to provide a service satisfying requirements to the UAVs. However, such cellular network does not have a technical solution for obtaining flight path information of the UAV, which reduces the quality of service provided by the cellular network to the UAV.

SUMMARY

Examples of the present disclosure provide methods and apparatuses for transmitting information.

According to a first aspect of the examples of the present disclosure, a method of transmitting information is provided. The method is applicable to an unmanned aerial vehicle (UAV), and the method includes:
  in response to that the UAV has flight path information, generating designated event information, where the designated event information indicates that the UAV has the flight path information;
  adding the designated event information to a first message; and
  sending the first message to a base station, such that the base station determines that the UAV has the flight path information according to the designated event information included in the first message.

Optionally, the first message includes first radio resource control (RRC) signaling, and the first RRC signaling includes a first information element for carrying the designated event information.

Optionally, the first information element includes a flight path information available element; and the first RRC signaling includes at least one of:
  RRC connection reconfiguration complete signaling;
  RRC connection reestablishment complete signaling;
  RRC connection resume complete signaling; or
  RRC connection setup complete signaling.

Optionally, the first message further includes the flight path information.

Optionally, the method further includes:
  receiving a second message from the base station, where the second message includes request information for obtaining the flight path information;
  generating a third message according to the second message, where the third message includes the flight path information; and
  sending the third message to the base station, such that the base station determines a flight path of the UAV according to the flight path information included in the third message.

Optionally, the second message includes second RRC signaling, and the second RRC signaling includes a second information element for carrying the request information.

Optionally, the second RRC signaling includes terminal information request signaling, and the second information element includes a flight path information request element.

Optionally, the third message includes third RRC signaling, and the third RRC signaling includes a third information element for carrying the flight path information.

Optionally, the third RRC signaling includes terminal information response signaling, and the third information element includes a flight path information report element.

According to a second aspect of the examples of the present disclosure, a method of transmitting information is provided. The method is applicable to a base station, and the method includes:
  receiving a first message from a UAV, where the first message includes designated event information, and the designated event information indicates that the UAV has flight path information; and
  determining that the UAV has the flight path information according to the designated event information.

Optionally, the first message includes first RRC signaling, and the first RRC signaling includes a first information element for carrying the designated event information.

Optionally, the first information element includes a flight path information available element; and the first RRC signaling includes at least one of:
  RRC connection reconfiguration complete signaling;
  RRC connection reestablishment complete signaling;
  RRC connection resume complete signaling; or
  RRC connection setup complete signaling.

Optionally, the first message further includes the flight path information, and the method further includes:
  obtaining the flight path information from the first message; and
  determining a flight path of the UAV according to the flight path information.

Optionally, the method further includes:
  in response to that the flight path information is to be obtained, generating a second message, where the second message includes request information for obtaining the flight path information;
  sending the second message to the UAV;
  receiving a third message from the UAV, where the third message includes the flight path information; and
  determining a flight path of the UAV according to the flight path information.

Optionally, the second message includes second RRC signaling, and the second RRC signaling includes a second information element for carrying the request information.

Optionally, the second RRC signaling includes terminal information request signaling, and the second information element includes a flight path information request element.

Optionally, the third message includes third RRC signaling, and the third RRC signaling includes a third information element for carrying the flight path information.

Optionally, the third RRC signaling includes terminal information response signaling, and the third information element includes a flight path information report element.

According to a third aspect of the examples of the present disclosure, an apparatus for transmitting information is provided. The apparatus is applicable to a UAV, and the apparatus includes:

a first generating module configured to, in response to that the UAV has flight path information, generate designated event information, where the designated event information indicates that the UAV has the flight path information;

an information adding module configured to add the designated event information to a first message; and a first sending module configured to send the first message to a base station, such that the base station determines that the UAV has the flight path information according to the designated event information included in the first message.

Optionally, the first message includes first radio resource control (RRC) signaling, and the first RRC signaling includes a first information element for carrying the designated event information.

Optionally, the first information element includes a flight path information available element; and the first RRC signaling includes at least one of:

RRC connection reconfiguration complete signaling;
RRC connection reestablishment complete signaling;
RRC connection resume complete signaling; or
RRC connection setup complete signaling.

Optionally, the first message further includes the flight path information.

Optionally, the apparatus further includes:

a message receiving module configured to receive a second message from the base station, where the second message includes request information for obtaining the flight path information;

a second generating module configured to generate a third message according to the second message, where the third message includes the flight path information; and a second sending module configured to send the third message to the base station, such that the base station determines a flight path of the UAV according to the flight path information included in the third message.

Optionally, the second message includes second RRC signaling, and the second RRC signaling includes a second information element for carrying the request information.

Optionally, the second RRC signaling includes terminal information request signaling, and the second information element includes a flight path information request element.

Optionally, the third message includes third RRC signaling, and the third RRC signaling includes a third information element for carrying the flight path information.

Optionally, the third RRC signaling includes terminal information response signaling, and the third information element includes a flight path information report element.

According to a fourth aspect of the examples of the present disclosure, an apparatus for transmitting information is provided. The apparatus is applicable to a base station, and the apparatus includes:

a first receiving module configured to receive a first message from a UAV, where the first message includes designated event information, and the designated event information indicates that the UAV has flight path information; and a first determining module configured to determine that the UAV has the flight path information according to the designated event information.

Optionally, the first message includes first RRC signaling, and the first RRC signaling includes a first information element for carrying the designated event information.

Optionally, the first information element includes a flight path information available element; and the first RRC signaling includes at least one of:

RRC connection reconfiguration complete signaling;
RRC connection reestablishment complete signaling;
RRC connection resume complete signaling; or
RRC connection setup complete signaling.

Optionally, the first message further includes the flight path information, and the apparatus further includes:

an obtaining module configured to obtain the flight path information from the first message; and a second determining module configured to determine a flight path of the UAV according to the flight path information.

Optionally, the apparatus further includes:

a message generating module configured to, in response to that the flight path information is to be obtained, generate a second message, where the second message includes request information for obtaining the flight path information;

a message sending module configured to send the second message to the UAV;

a second receiving module configured to receive a third message from the UAV, where the third message includes the flight path information; and a third determining module configured to determine a flight path of the UAV according to the flight path information.

Optionally, the second message includes second RRC signaling, and the second RRC signaling includes a second information element for carrying the request information.

Optionally, the second RRC signaling includes terminal information request signaling, and the second information element includes a flight path information request element.

Optionally, the third message includes third RRC signaling, and the third RRC signaling includes a third information element for carrying the flight path information.

Optionally, the third RRC signaling includes terminal information response signaling, and the third information element includes a flight path information report element.

According to a fifth aspect of the examples of the present disclosure, there is provided a non-transitory computer-readable storage medium storing a computer program, where the computer program is to execute the method of transmitting information of the first aspect described above.

According to a sixth aspect of the examples of the present disclosure, there is provided a non-transitory computer-readable storage medium storing a computer program, where the computer program is to execute the method of transmitting information of the second aspect described above.

According to a seventh aspect of the examples of the present disclosure, an apparatus for transmitting information is provided. The apparatus is applicable to a UAV, and the apparatus includes:

a processor, and a memory for storing instructions executable by the processor, where the processor is configured to:

in response to that the UAV has flight path information, generate designated event information, where the designated event information indicates that the UAV has the flight path information;

add the designated event information to a first message; and send the first message to a base station, such that the base station determines that the UAV has the flight path information according to the designated event information included in the first message.

According to an eighth aspect of the examples of the present disclosure, an apparatus for transmitting information is provided. The apparatus is applicable to a base station, and the apparatus includes:

a processor, and a memory for storing instructions executable by the processor, where the processor is configured to:

receive a first message from a UAV, where the first message includes designated event information, and the designated event information indicates that the UAV has flight path information; and determine that the UAV has the flight path information according to the designated event information.

It should be understood that the above general description and the following detailed description are merely exemplary and explanatory, and do not limit the present disclosure.

BRIEF DESCRIPTION OF THE DRAWINGS

The accompanying drawings herein are incorporated in and constitute a part of this description, illustrate examples consistent with the present disclosure, and together with the description serve to explain the principles of the present disclosure.

DETAILED DESCRIPTION OF THE EMBODIMENTS

Figure 1:
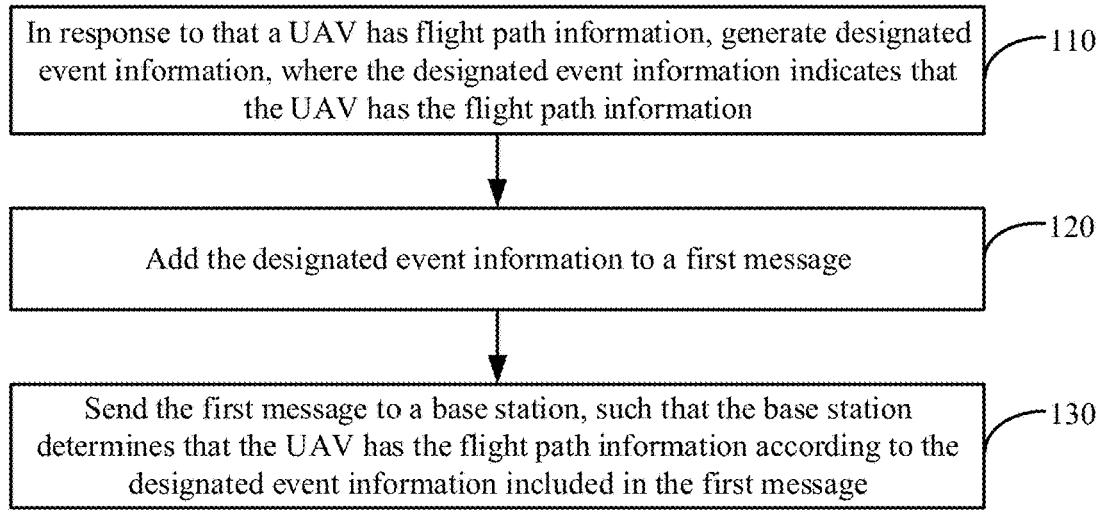
FIG. 1 is a flowchart illustrating a method of transmitting information according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the word "if" as used herein may be interpreted as "when" or "upon" or "in response to determining".

Figure 2:
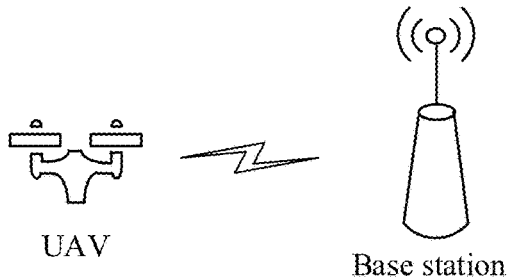
FIG. 2 is an application scenario diagram illustrating a method of transmitting information according to an example.

FIG. 1 is a flowchart illustrating a method of transmitting information according to an example, and FIG. 2 is an application scenario diagram illustrating a method of transmitting information according to an example. The method of transmitting information can be applicable to a UAV. As shown in FIG. 1, the method of transmitting information includes the following steps 110-130.

At step 110, in response to that the UAV has flight path information, designated event information is generated. The designated event information indicates that the UAV has the flight path information.

In examples of the present disclosure, a flight mode of the UAV generally includes a fixed mode, that is, an operator may plan the flight path information of the UAV on a controller, such that the controller does not have to control the UAV all the time. For example, the controller may set the flight path information for the UAV in an application. Moreover, in the fixed mode, the UAV can fly autonomously based on the flight path information it receives. After obtaining the flight path information, the base station can predict which base stations the UAV will pass through. In this way, mobility of the UAV is improved.

In this mode, upon determining that the UAV itself has flight path information, the UAV can generate the designated event information, so as to inform the base station about the UAV having the flight path information via the designated event information.

At step 120, the designated event information is added to a first message.

In the examples of the present disclosure, the first message can be used to carry the designated event information.

At step 130, the first message is sent to a base station, such that the base station determines that the UAV has the flight path information according to the designated event information included in the first message.

In an exemplary application scenario, as shown in FIG. 2, the application scenario includes a UAV and a base station. The base station is a base station in a cellular network that provides a current service to the UAV. When the UAV determines that the UAV itself has flight path information, designated event information is generated, where the designated event information indicates that the UAV has the flight path information. Then the UAV adds the designated event information to a first message, and sends the first message to the base station. When receiving the first message, the base station can determine that the UAV has the flight path information according to the designated event information included in the first message.

As seen from the example, when determining that the UAV has the flight path information, the UAV can generate the designated event information, where the designated event information characterizes that the UAV has the flight path information. The designated event information is added to the first message, and the first message is sent to the base station. Thus, the base station can determine that the UAV has the flight path information according to the designated event information included in the first message. Therefore, a success rate of the base station in acquiring the flight path information is improved, which in turn improves mobile performance of the UAV based on the flight path information.

In an example, the first message in step 130 may include first Radio Resource Control (RRC) signaling, and the first RRC signaling may include a first information element for carrying the designated event information.

In the examples of the present disclosure, the UAV may be a UAV in an idle state. During a process of establishing an RRC connection with the base station, that is, switching from an idle state to a connected state, the UAV can inform the base station, via the first RRC signaling, about the designated event information representing that the UAV has the flight path information.

In addition, if the first message further includes flight path information, in addition to the first information element for carrying the designated event information, the first message may also include an information element carrying the flight path information.

As seen from the example, during the process of establishing the RRC connection between the UAV and the base station, the designated event information of the UAV having the flight path information can be informed to the base station through the first RRC signaling, which facilitates the base station to know whether the UAV has the flight path information in the process of establishing the RRC connection with the UAV. Thus, reliability of information transmission is improved.

In an example, the first RRC signaling may include but is not limited to at least one of:

RRC connection reconfiguration complete (e.g., RRCConnectionReconfigurationComplete) signaling;
RRC connection reestablishment complete (e.g., RRCConnectionReestablishmentComplete) signaling;
RRC connection resume complete (e.g., RRCConnectionResumeComplete) signaling; or
RRC connection setup complete (e.g., RRCConnectionSetupComplete) signaling.

In addition, the first information element may include a flight path information available (e.g., FlightPathInformationAvailable) element. The flight path information available element may be an information element specifically defined for UAVs.

As seen from the example, different specified first RRC signaling can be used to inform the base station about the designated event information of the UAV having the flight path information, thereby improving efficiency of information transmission.

In an example, the first message at step 130 may also include flight path information of the UAV. The flight path information of the UAV can include many contents, such as coordinate points of a flight trajectory of the UAV, etc.

In the examples of the present disclosure, when the UAV determines that the UAV itself has the flight path information and informs the base station of this event through the first message, the UAV may also add the flight path information of the UAV directly to the first message. In this way, when knowing the event that the UAV has the flight path information, the base station can also directly acquire the flight path information of the UAV from the first message.

It can be seen from the examples that the first message may also include the flight path information of the UAV, which facilitates the base station to obtain the flight path information from the first message directly, thereby improving mobile performance of the UAV based on the flight path information.

Figure 3:
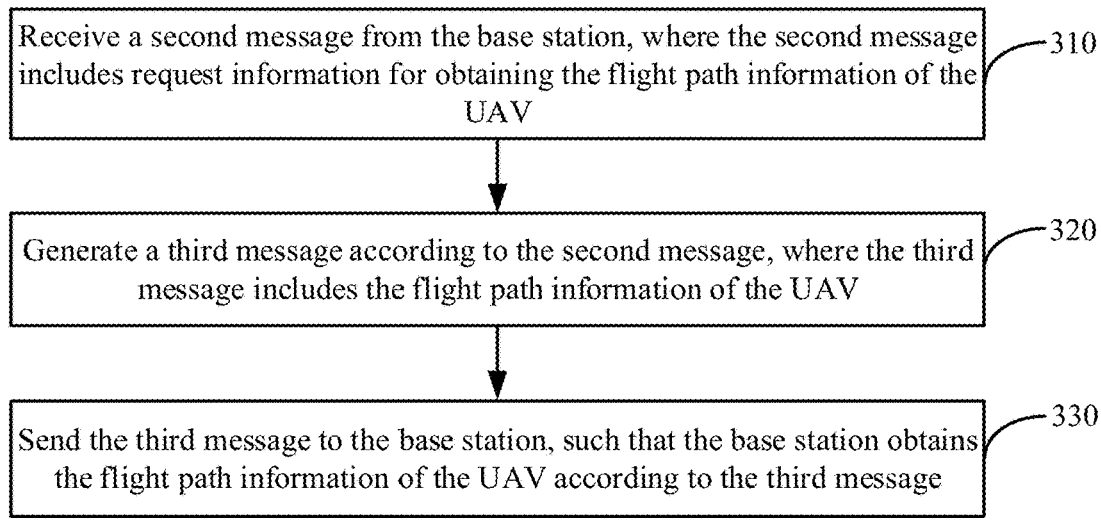
FIG. 3 is a flowchart illustrating another method of transmitting information according to an example.

FIG. 3 is a flowchart illustrating another method of transmitting information according to an example. The method of transmitting information can be applicable to a UAV. This method is based on the method shown in FIG. 1, in which a UAV may provide fight path information to a base station in response to a request from the base station. As shown in FIG. 3, the method of transmitting information includes the following steps 310-330.

At step 310, a second message from the base station is received. The second message includes request information for obtaining flight path information of the UAV.

In the examples of the present disclosure, after the base station determines that the UAV has flight path information, the base station may or may not need to obtain the flight path information. Moreover, when the base station determines that the flight path information is needed, the base station requests the flight path information from the UAV through the second message. Accordingly, in response to receiving the second message from the base station, the UAV can determine that the base station is to obtain the flight path information according to the second message. In this case, the UAV can report the flight path information to the base station, which facilitates the base station to improve mobility of the UAV based on the flight path information.

At step 320, a third message is generated according to the second message. The third message includes the flight path information of the UAV.

At step 330, the third message is sent to the base station, such that the base station obtains the flight path information of the UAV from the third message.

As seen from the example, when the second message from the base station is received, the third message is generated according to the second message, where the third message includes the flight path information of the UAV. And then the third message is sent to the base station, such that the base station can obtain the flight path information of the UAV from the third message. Thus, mobility of the UAV is improved according to the flight path information, and practicability of information transmission is improved.

In an example, the second message in step 310 may include second RRC signaling, and the second RRC signaling may include a second information element for carrying request information of the base station.

As seen from the example, in a process of establishing an RRC connection between the UAV and the base station, the request information of the base station can be obtained through the second RRC signaling, thereby improving reliability of information transmission.

In an example, the second RRC signaling includes terminal information request (e.g., UEInformationRequest) signaling, and the second information element includes a flight path information request (e.g., FlightPathInformationReq) element.

It can be seen from the example that the request information of the base station can be sent to the UAV through the terminal information request signaling, thereby improving the accuracy of information transmission.

In an example, the third message at step 320 may include third RRC signaling, and the third RRC signaling may include a third information element for carrying the flight path information of the UAV.

It can be seen from the example that in a process of establishing an RRC connection between the UAV and the base station, the flight path information of the UAV can be sent to the base station through the third RRC signaling, thereby improving reliability of information transmission.

In an example, the third RRC signaling includes terminal information response (e.g., UEInformationResponse) signaling, and the third information element includes a flight path information report (e.g., FlightPathInformationReport) element.

It can be seen from the example that the flight path information of the UAV can be sent to the base station through the Terminal information response signaling, thereby improving the accuracy of information transmission.

Figure 4:
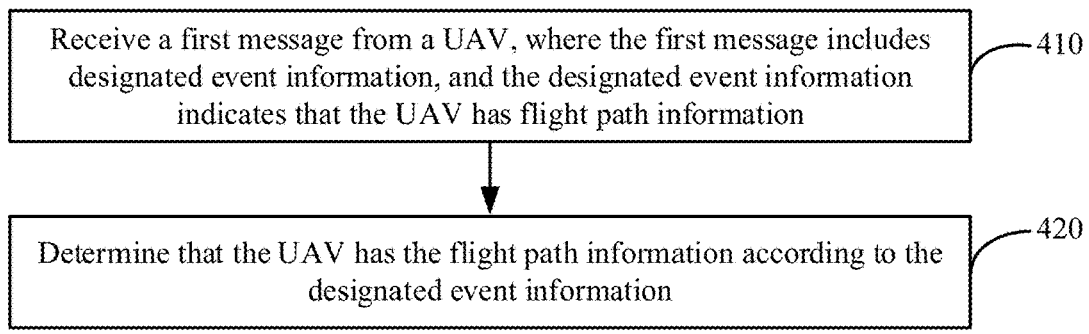
FIG. 4 is a flowchart illustrating a method of transmitting information according to an example.

FIG. 4 is a flowchart illustrating a method of transmitting information according to an example. The method of transmitting information can be applicable to a base station which provides a service to a UAV. As shown in FIG. 4, the method of transmitting information includes the following steps 410-420.

At step 410, a first message from a UAV is received. The first message includes designated event information, and the designated event information indicates that the UAV has flight path information.

At step 420, it is determined that the UAV has the flight path information according to the designated event information.

In examples of the present disclosure, once the base station is aware that the UAV has the flight path information, the base station can determine whether the base station itself is to obtain the flight path information based on an actual situation, such that the base station can improve mobile performance of the UAV based on the flight path information of the UAV. For example, upon obtaining the flight path information, the base station can calculate which base station is a next possible base station for the UAV to be handover, and prepare for the handover with the next possible base station in advance. Moreover, handover resources for the UAV can also be prepared in advance. Thus, latency of the handover can be reduced.

As seen from the example, the first message from the UAV is received, where the first message includes the designated event information, and the designated event information is used to characterize that the UAV has the flight path information. And then it is determined that the UAV has the flight path information according to the designated event information. Thus, a success rate of the base station in acquiring the flight path information is improved, which in turn improves mobile performance of the UAV based on the flight path information.

In an example, the first message in step 410 may include first RRC signaling, and the first RRC signaling may include a first information element for carrying the designated event information.

In the examples of the present disclosure, the UAV may be a UAV in an idle state. During a process of establishing an RRC connection with the base station, that is, switching from an idle state to a connected state, the UAV can inform the base station, via the first RRC signaling, about the designated event information representing that the UAV has the flight path information.

In addition, if the first message further includes flight path information, in addition to the first information element for carrying the designated event information, the first message may also include an information element carrying the flight path information.

As seen from the example, during the process of establishing the RRC connection between the UAV and the base station, the designated event information of the UAV having the flight path information can be received through the first RRC signaling. Thus, the base station is aware whether the UAV has the flight path information in the process of establishing the RRC connection with the UAV, which improves reliability of information transmission.

In an example, the first RRC signaling may include but is not limited to at least one of:
  RRC connection reconfiguration complete signaling;
  RRC connection reestablishment complete signaling;
  RRC connection resume complete signaling; or
  RRC connection setup complete signaling.

In addition, the first information element may include a flight path information available element. The flight path information available element may be an information element specifically defined for UAVs.

As seen from the example, different specified first RRC signaling can be used to inform the base station of the designated event information of the UAV having the flight path information, thereby improving the efficiency of information transmission.

Figure 5:
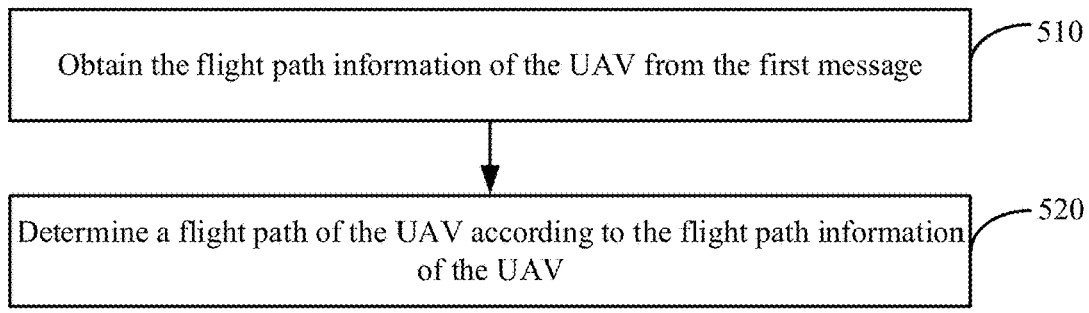
FIG. 5 is a flowchart illustrating another method of transmitting information according to an example.

FIG. 5 is a flowchart illustrating another method of transmitting information according to an example. The method of transmitting information can be applicable to in a base station. This method is based on the method shown in FIG. 4, in which the first message may also include the flight path information of the UAV. As shown in FIG. 5, the method of transmitting information further includes the following steps 510-520.

At step 510, the flight path information of the UAV is obtained from the first message. The flight path information of the UAV can include many contents, such as coordinate points of a flight trajectory of the UAV, etc.

In the examples of the present disclosure, when the UAV determines that the UAV itself has the flight path information and informs the base station of this event through the first message, the UAV may also add the flight path information of the UAV directly to the first message. In this way, when knowing the event that the UAV has the flight path information, the base station can also directly acquire the flight path information of the UAV from the first message.

At step 520, a flight path of the UAV is determined according to the flight path information of the UAV.

As seen from the example, the first message may also include the flight path information of the UAV, so the flight path information of the UAV can be obtained from the first message. The flight path of the UAV is determined according to the flight path information of the UAV, thereby improving mobile performance of the UAV based on the flight path information.

Figure 6:
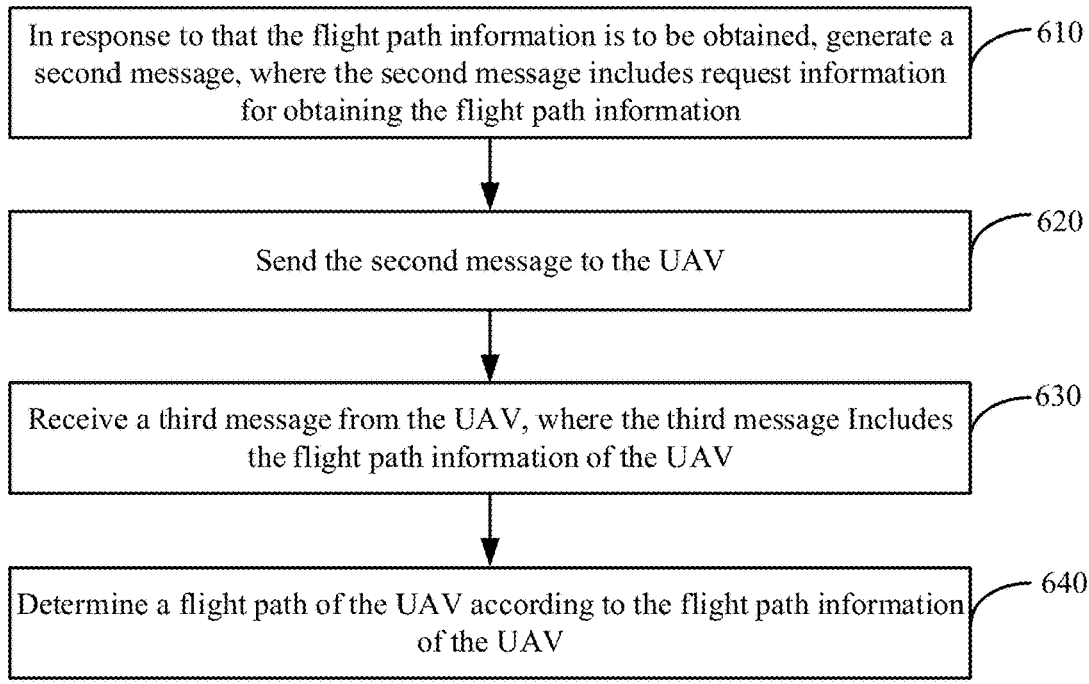
FIG. 6 is a flowchart illustrating another method of transmitting information according to an example.

FIG. 6 is a flowchart illustrating another method of transmitting information according to an example. The method of transmitting information can be applicable to a base station. This method is based on the method shown in FIG. 4, in which the base station requests flight path information from a UAV. As shown in FIG. 6, the method of transmitting information includes the following steps 610-640.

At step 610, in response to that the flight path information is to be obtained, a second message is generated. The second message includes request information for obtaining the flight path information.

In an example of the present disclosure, the second message carries the request information of the base station.

At step 620, the second message is sent to the UAV.

At step 630, a third message from the UAV is received. The third message includes the flight path information of the UAV.

At step 640, a flight path of the UAV is determined according to the flight path information of the UAV.

As seen from the example, when determining that the flight path information needs to be obtained, the second message is generated, where the second message includes the request information for obtaining the flight path information. The second message is sent to the UAV, and the third message is received, where the third message includes the flight path information of the UAV. In this way, the base station can decide whether to require the UAV to provide the flight path information according to an actual situation. Thus, a specific need of the base station for the flight path information is satisfied, and mobile performance of the UAV is improved based on the flight path information.

In an example, the second message in step 610 may include second RRC signaling, and the second RRC signaling may include a second information element for carrying request information of the base station.

As seen from the example, in a process of establishing an RRC connection between the UAV and the base station, the request information of the base station can be sent via the second RRC signaling, thereby improving reliability of information transmission.

In an example, the second RRC signaling includes terminal information request signaling, and the second information element includes a flight path information request element.

It can be seen from the example that the request information of the base station can be sent to the UAV through the terminal information request signaling, thereby improving the accuracy of information transmission.

In an example, the third message at step 630 may include third RRC signaling, and the third RRC signaling may include a third information element for carrying the flight path information of the UAV.

It can be seen from the example that in a process of establishing an RRC connection between the UAV and the base station, the flight path information of the UAV can be received via the third RRC signaling, thereby improving reliability of information transmission.

In an example, the third RRC signaling includes terminal information response signaling, and the third information element includes a flight path information report element.

It can be seen from the example that the flight path information of the UAV can be received via the terminal information response signaling, thereby improving the accuracy of information transmission.

Figure 7:
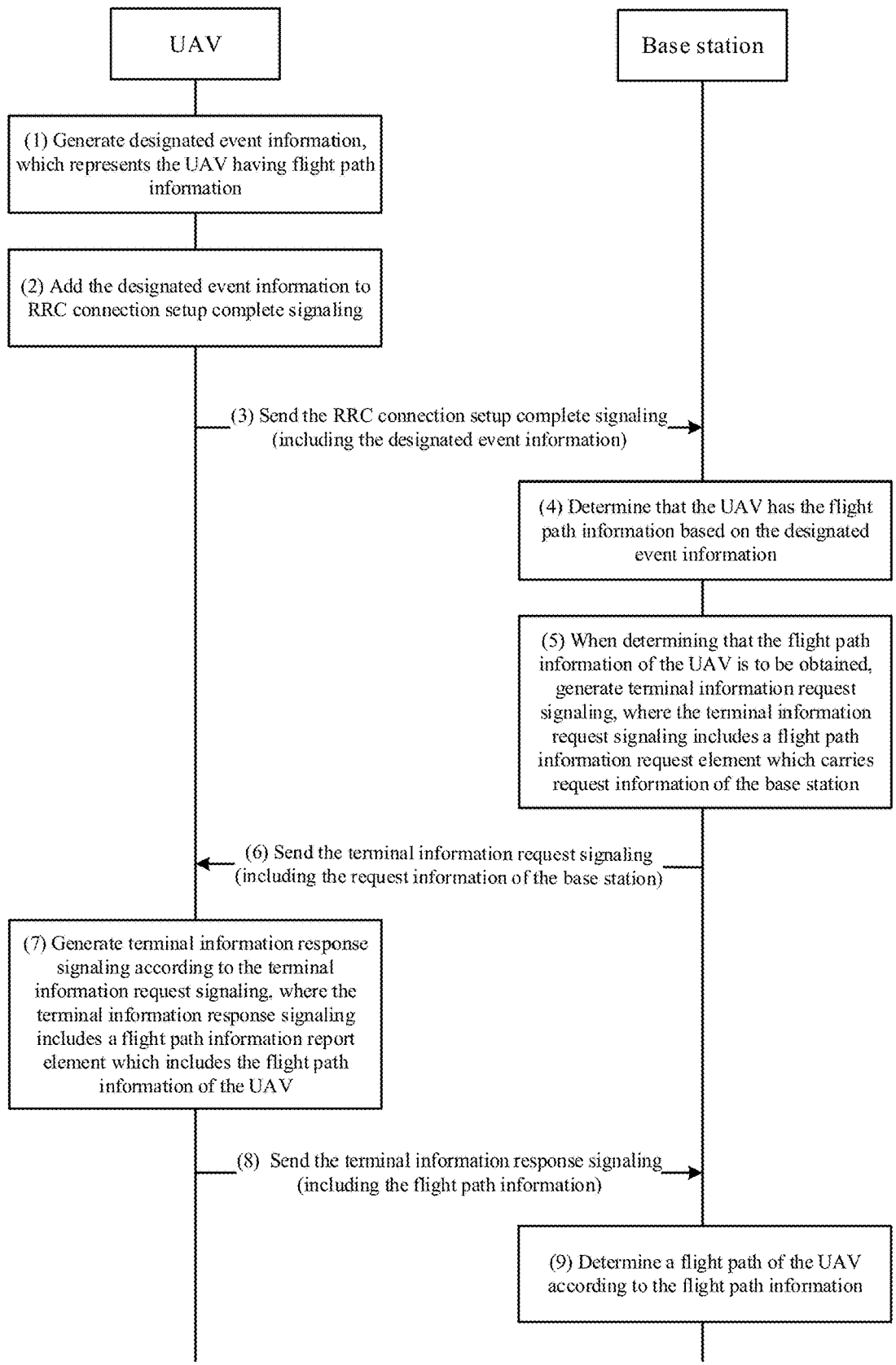
FIG. 7 is an information interaction diagram illustrating a method of transmitting information according to an example.

FIG. 7 is an information interaction diagram illustrating a method of transmitting information according to an example. As shown in FIG. 7, the information interaction diagram includes a UAV and a base station. An application scenario thereof is that the UAV in an idle state determines that the UAV has flight path information, and then the UAV establishes an RRC connection with the base station.

(1) The UAV generates designated event information, which represents the UAV having flight path information.

(2) The UAV adds the designated event information to RRC connection setup complete signaling.

(3) The UAV sends the RRC connection setup complete signaling to the base station. The RRC connection setup complete signaling includes the designated event information.

(4) The base station determines that the UAV has the flight path information based on the designated event information.

(5) When the base station determines that the flight path information of the UAV is to be obtained, the base station generates terminal information request signaling. The terminal information request signaling includes a flight path information request element which carries the request information of the base station.

(6) The base station sends the terminal information request signaling to the UAV. The terminal information request signaling includes the request information of the base station.

(7) The UAV generates terminal information response signaling according to the terminal information request signaling. The terminal information response signaling includes a flight path information report element which includes the flight path information of the UAV.

(8) The UAV sends the terminal information response signaling to the base station. The terminal information response signaling includes the flight path information of the UAV.

(9) The base station determines a flight path of the UAV according to the flight path information.

Corresponding to the foregoing examples of the methods of transmitting information, the present disclosure also provides examples of apparatuses for transmitting information.

Figure 8:
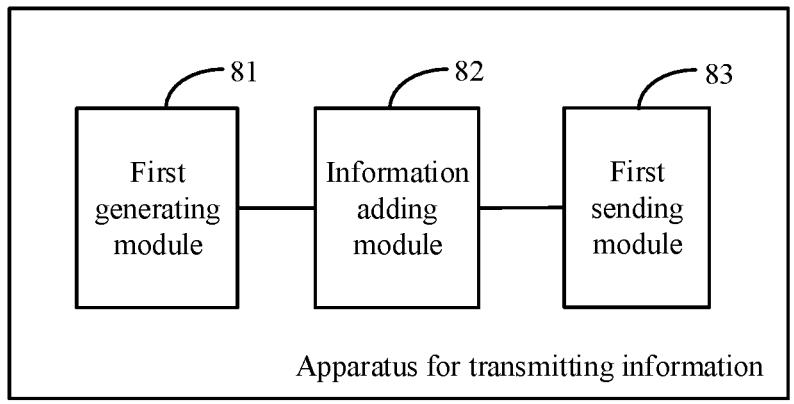
FIG. 8 is a block diagram illustrating an apparatus for transmitting information according to an example.

FIG. 8 is a block diagram illustrating an apparatus for transmitting information according to an example. The apparatus for transmitting information can be applicable to a UAV, and used to implement the method of transmitting information shown in FIG. 1. As shown in FIG. 8, the apparatus for transmitting information may include the following modules.

A first generating module 81 is configured to, in response to that the UAV has flight path information, generate designated event information, where the designated event information indicates that the UAV has the flight path information.

An information adding module 82 is configured to add the designated event information to the first message.

A first sending module 83 is configured to send the first message to a base station, such that the base station determines that the UAV has the flight path information according to the designated event information included in the first message.

As seen from the example, when it is determined that the UAV has the flight path information, the UAV can generate the designated event information, where the designated event information characterizes that the UAV has the flight path information. The designated event information is added to the first message, and the first message is sent to the base station. Thus, the base station can determine that the UAV has the flight path information according to the designated event information included in the first message. Therefore, a success rate of the base station in acquiring the flight path information is improved, which in turn improves mobile performance of the UAV based on the flight path information.

In an example, on the basis of the apparatus shown in FIG. 8, the first message includes first RRC signaling, and the first RRC signaling includes a first information element for carrying the designated event information.

As seen from the example, during the process of establishing the RRC connection between the UAV and the base station, the designated event information of the UAV having the flight path information can be informed to the base station through the first RRC signaling, which facilitates the base station to know whether the UAV has the flight path information in the process of establishing the RRC connection with the UAV. Thus, reliability of information transmission is improved.

In an example, on the basis of the apparatus shown in FIG. 8, the first information element includes a flight path information available element; the first RRC signaling may include at least one of:

RRC connection reconfiguration complete signaling;
RRC connection reestablishment complete signaling;
RRC connection resume complete signaling; or
RRC connection setup complete signaling.

As seen from the example, different specified first RRC signaling can be used to inform the base station of the designated event information of the UAV having the flight path information, thereby improving the efficiency of information transmission.

In an example, the first message further includes the flight path information.

It can be seen from the examples that the first message may also include the flight path information of the UAV, which facilitates the base station to obtain the flight path information from the first message directly, thereby improving mobile performance of the UAV based on the flight path information.

Figure 9:
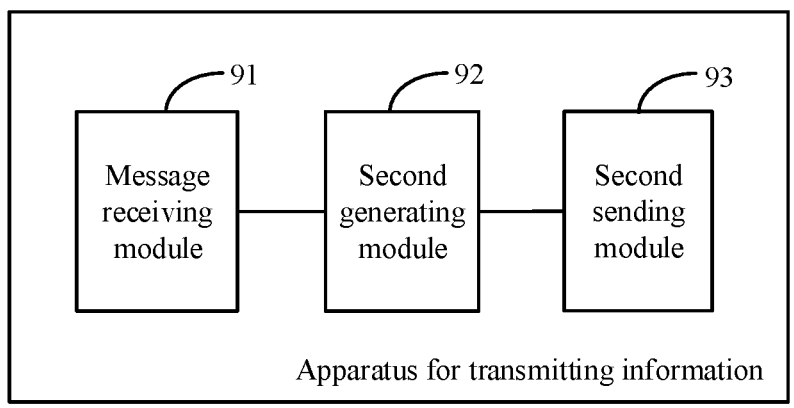
FIG. 9 is a block diagram illustrating another apparatus for transmitting information according to an example.

In an example, on the basis of the apparatus shown in FIG. 8, as shown in FIG. 9, the apparatus further includes the following modules.

A message receiving module 91 is configured to receive a second message from the base station, where the second message includes request information for obtaining the flight path information.

A second generating module 92 is configured to generate a third message according to the second message, where the third message includes the flight path information.

A second sending module 93 is configured to send the third message to the base station, such that the base station determines a flight path of the UAV according to the flight path information included in the third message.

As seen from the example, when the second message from the base station is received, the third message is generated according to the second message, where the third message includes the flight path information of the UAV. And then the third message is sent to the base station, such that the base station can obtain the flight path information of the UAV from the third message. Thus, mobility of the UAV is improved according to the flight path information, and practicability of information transmission is improved.

In an example, on the basis of the apparatus shown in FIG. 9, the second message includes second RRC signaling, and the second RRC signaling includes a second information element for carrying the request information.

As seen from the example, in a process of establishing an RRC connection between the UAV and the base station, the request information of the base station can be acquired through the second RRC signaling, thereby improving reliability of information transmission.

In an example, the second RRC signaling includes terminal information request signaling, and the second information element includes a flight path information request element.

It can be seen from the example that the request information of the base station can be sent to the UAV through the terminal information request signaling, thereby improving the accuracy of information transmission.

In an example, on the basis of the apparatus shown in FIG. 9, the third message includes third RRC signaling, and the third RRC signaling includes a third information element for carrying the flight path information.

It can be seen from the example that in a process of establishing an RRC connection between the UAV and the base station, the flight path information of the UAV can be sent to the base station through the third RRC signaling, thereby improving reliability of information transmission.

In an example, the third RRC signaling includes terminal information response signaling, and the third information element includes a flight path information report element.

It can be seen from the example that the flight path information of the UAV can be sent to the base station through the Terminal information response signaling, thereby improving the accuracy of information transmission.

Figure 10:
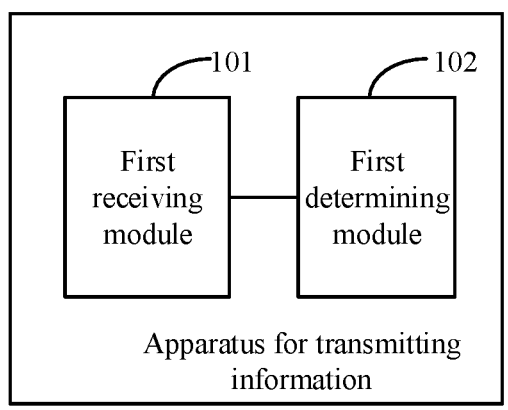
FIG. 10 is a block diagram illustrating an apparatus for transmitting information according to an example.

FIG. 10 is a block diagram illustrating an apparatus for transmitting information according to an example. The apparatus for transmitting information can be applicable to a base station, and used to implement the method of transmitting information shown in FIG. 4. As shown in FIG. 10, the apparatus for transmitting information may include the following modules.

A first receiving module 101 is configured to receive a first message from a UAV, where the first message includes designated event information, and the designated event information indicates that the UAV has flight path information.

A first determining module 102 is configured to determine that the UAV has the flight path information according to the designated event information.

As seen from the example, the first message from the UAV is received, where the first message includes the designated event information, and the designated event information is used to characterize that the UAV has the flight path information. And then it is determined that the UAV has the flight path information according to the designated event information. Thus, a success rate of the base station in acquiring the flight path information is improved, which in turn improves mobile performance of the UAV based on the flight path information.

In an example, on the basis of the apparatus shown in FIG. 10, the first message includes first RRC signaling, and the first RRC signaling includes a first information element for carrying the designated event information.

As seen from the example, during the process of establishing the RRC connection between the UAV and the base station, the designated event information of the UAV having the flight path information can be received through the first RRC signaling. Thus, the base station is aware whether the UAV has the flight path information in the process of establishing the RRC connection with the UAV, which improves reliability of information transmission.

In an example, the first information element includes a flight path information available element, and the first RRC signaling includes at least one of:

RRC connection reconfiguration complete signaling;
RRC connection reestablishment complete signaling;
RRC connection resume complete signaling; or
RRC connection setup complete signaling.

As seen from the example, different specified first RRC signaling can be used to inform the base station of the designated event information of the UAV having the flight path information, thereby improving the efficiency of information transmission.

Figure 11:
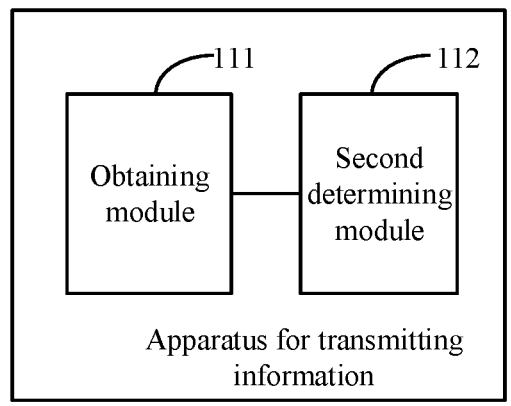
FIG. 11 is a block diagram illustrating another apparatus for transmitting information according to an example.

In an example, on the basis of the apparatus shown in FIG. 10, the first message further includes the flight path information, and as shown in FIG. 11, the apparatus further includes the following modules.

An obtaining module 111 is configured to obtain the flight path information from the first message.

A second determining module 112 is configured to determine a flight path of the UAV according to the flight path information.

As seen from the example, the first message may also include the flight path information of the UAV, so the flight path information of the UAV can be obtained from the first message. The flight path of the UAV is determined according to the flight path information of the UAV, thereby improving mobile performance of the UAV based on the flight path information.

Figure 12:
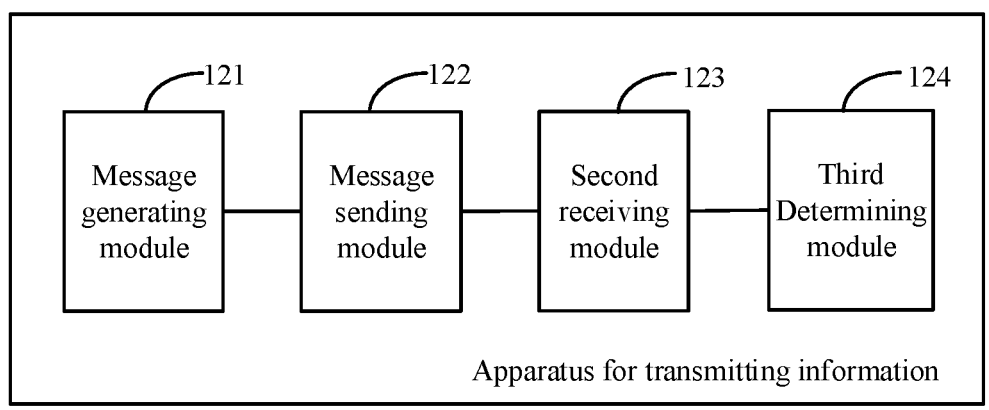
FIG. 12 is a block diagram illustrating another apparatus for transmitting information according to an example.

In an example, on the basis of the apparatus shown in FIG. 10, as shown in FIG. 12, the apparatus further includes the following modules.

A message generating module 121 is configured to, in response to that the flight path information is to be obtained, generate a second message, where the second message includes request information for obtaining the flight path information.

A message sending module 122 is configured to send the second message to the UAV.

A second receiving module 123 is configured to receive a third message from the UAV, where the third message includes the flight path information.

A third determining module 124 is configured to determine a flight path of the UAV according to the flight path information.

As seen from the example, when determining that the flight path information needs to be obtained, the second message is generated, where the second message includes the request information for obtaining the flight path information. The second message is sent to the UAV, and the third message is received, where the third message includes the flight path information of the UAV. In this way, the base station can decide whether to require the UAV to provide the flight path information according to an actual situation. Thus, a specific need of the base station for the flight path information is satisfied, and mobile performance of the UAV is improved based on the flight path information.

In an example, on the basis of the apparatus shown in FIG. 12, the second message includes second RRC signaling, and the second RRC signaling includes a second information element for carrying the request information.

As seen from the example, in a process of establishing an RRC connection between the UAV and the base station, the request information of the base station can be sent via the second RRC signaling, thereby improving reliability of information transmission.

In an example, the second RRC signaling includes terminal information request signaling, and the second information element includes a flight path information request element.

It can be seen from the example that the request information of the base station can be sent to the UAV through the terminal information request signaling, thereby improving the accuracy of information transmission.

In an example, on the basis of the apparatus shown in FIG. 12, the third message includes third RRC signaling, and the third RRC signaling includes a third information element for carrying the flight path information.

It can be seen from the example that in a process of establishing an RRC connection between the UAV and the base station, the flight path information of the UAV can be received via the third RRC signaling, thereby improving reliability of information transmission.

In an example, the third RRC signaling includes terminal information response signaling, and the third information element includes a flight path information report element.

It can be seen from the example that the flight path information of the UAV can be received via the terminal information response signaling, thereby improving the accuracy of information transmission.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, the present disclosure also provides a non-transitory computer-readable storage medium on which a computer program is stored, where the computer program is to execute the method of transmitting information according to any one of the above-mentioned FIGS. 1 to 3.

Correspondingly, the present disclosure also provides a non-transitory computer-readable storage medium on which a computer program is stored, where the computer program is to execute the method of transmitting information according to any one of the above-mentioned FIGS. 4 to 6.

Correspondingly, the present disclosure also provides an apparatus for transmitting information, which is applicable to a UAV, and the apparatus includes:
a processor, and
a memory for storing instructions executable by the processor,
where the processor is configured to:
in response to that the UAV has flight path information, generate designated event information, where the designated event information indicates that the UAV has the flight path information;
add the designated event information to a first message; and
send the first message to a base station, such that the base station determines that the UAV has the flight path information according to the designated event information included in the first message.

Correspondingly, the present disclosure also provides an apparatus for transmitting information, which is applicable to a base station, and the apparatus includes:
a processor, and
a memory for storing instructions executable by the processor,
where the processor is configured to:
receive a first message from a UAV, where the first message includes designated event information, and the designated event information indicates that the UAV has flight path information; and determine that the UAV has the flight path information according to the designated event information.

Figure 13:
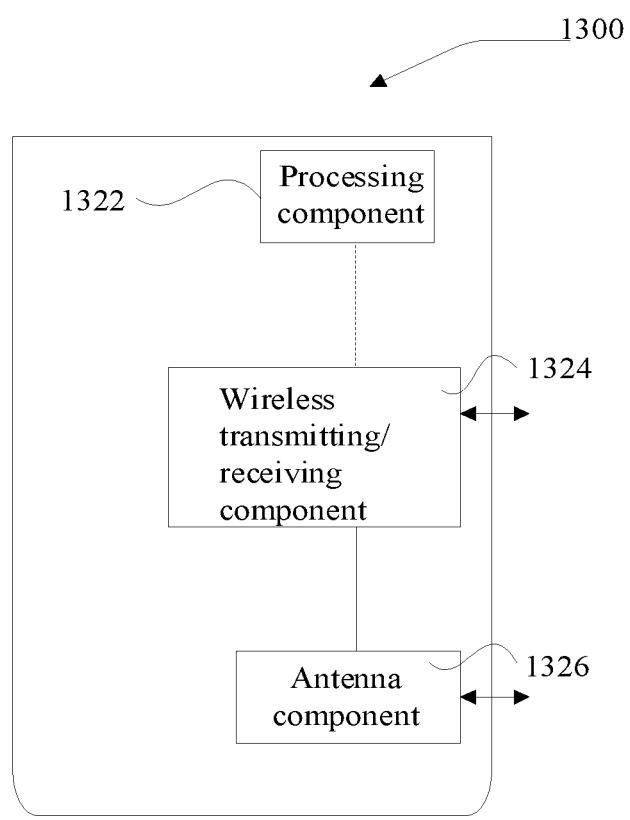
FIG. 13 is a schematic structural diagram illustrating an apparatus for transmitting information according to an example.

FIG. 13 is a schematic structural diagram illustrating an apparatus for transmitting information according to an example. An apparatus 1300 may be provided as a base station. As shown in FIG. 13, the apparatus 1300 includes a processing component 1322, a wireless transmitting/receiving component 1324, an antenna component 1326, and a signal processing component specific to a wireless interface. The processing component 1322 may further include one or more processors.

One of the processors in the processing component 1322 may be configured to execute any one of the foregoing methods of transmitting information.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It should be understood that the present disclosure is not limited to the precise structures already described above and shown in the drawings, and that various modifications and changes may be made without departing from the scope thereof.

What is claimed is:

1. A method of transmitting information, performed by an unmanned aerial vehicle (UAV), comprising:
   generating designated event information in response to determining that the UAV is in an idle state and has flight path information, wherein the designated event information indicates that the UAV has the flight path information;
   adding the designated event information to a first message; and
   sending the first message to a base station such that the base station determines that the UAV has the flight path information according to the designated event information comprised in the first message;
   wherein the first message comprises first radio resource control (RRC) signaling;
   the first RRC signaling comprises a first information element for carrying the designated event information;
   the first information element comprises a flight path information available element; and
   the first RRC signaling comprises RRC connection setup complete signaling.

2. The method according to claim 1, wherein the first message further comprises the flight path information.

3. The method according to claim 1, further comprising:
   receiving a second message from the base station, wherein the second message comprises request information for obtaining the flight path information;
   generating a third message according to the second message, wherein the third message comprises the flight path information; and
   sending the third message to the base station such that the base station determines a flight path of the UAV according to the flight path information comprised in the third message.

4. The method according to claim 3, wherein
   the second message comprises second RRC signaling, and
   the second RRC signaling comprises a second information element for carrying the request information.

5. The method according to claim 4, wherein
   the second RRC signaling comprises terminal information request signaling, and
   the second information element comprises a flight path information request element.

6. The method according to claim 3, wherein
   the third message comprises third RRC signaling, and
   the third RRC signaling comprises a third information element for carrying the flight path information.

7. The method according to claim 6, wherein
   the third RRC signaling comprises terminal information response signaling, and
   the third information element comprises a flight path information report element.

8. A method of transmitting information, performed by a base station, comprising:
   receiving a first message from an unmanned aerial vehicle (UAV) in an idle state, wherein the first message comprises designated event information, and the designated event information indicates that the UAV has flight path information; and
   determining that the UAV has the flight path information according to the designated event information;
   wherein the first message comprises first radio resource control (RRC) signaling;
   the first RRC signaling comprises a first information element for carrying the designated event information;
   the first information element comprises a flight path information available element; and
   the first RRC signaling comprises RRC connection setup complete signaling.

9. The method according to claim 8, wherein the first message further comprises the flight path information, and the method further comprises:
   obtaining the flight path information from the first message; and
   determining a flight path of the UAV according to the flight path information.

10. The method according to claim 8, further comprising:
    generating, by the base station, a second message when the flight path information is to be obtained, wherein the second message comprises request information for obtaining the flight path information;
    sending, by the base station, the second message to the UAV;
    receiving, by the base station, a third message from the UAV, wherein the third message comprises the flight path information; and
    determining, by the base station, a flight path of the UAV according to the flight path information.

11. The method according to claim 10, wherein
the second message comprises second RRC signaling, and
the second RRC signaling comprises a second information element for carrying the request information.

12. The method according to claim 11, wherein
the second RRC signaling comprises terminal information request signaling, and
the second information element comprises a flight path information request element.

13. The method according to claim 10, wherein
the third message comprises third RRC signaling, and
the third RRC signaling comprises a third information element for carrying the flight path information.

14. The method according to claim 13, wherein the third RRC signaling comprises terminal information response signaling, and the third information element comprises a flight path information report element.

15. A base station, comprising:
a processor, and
a memory for storing instructions executable by the processor,
wherein the processor is configured to execute the method of transmitting information according to claim 8.

16. An unmanned aerial vehicle (UAV), comprising:
a processor, and
a memory for storing instructions executable by the processor,
wherein the processor is configured to:
generate designated event information in response to determining that the UAV is in an idle state and has flight path information, wherein the designated event information indicates that the UAV has the flight path information;
add the designated event information to a first message; and
send the first message to a base station, such that the base station determines that the UAV has the flight path information according to the designated event information comprised in the first message;
wherein the first message comprises first radio resource control (RRC) signaling;
the first RRC signaling comprises a first information element for carrying the designated event information;
the first information element comprises a flight path information available element; and
the first RRC signaling comprises RRC connection setup complete signaling.

* * * * *